United States Patent
McClure et al.

(10) Patent No.: US 6,651,418 B1
(45) Date of Patent: Nov. 25, 2003

(54) MODULAR PICKUP, STUFFER, AND ROTOR

(75) Inventors: John R. McClure, New Holland, PA (US); William Dale Hotaling, New Holland, PA (US); Fred M. Horchler, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/198,751

(22) Filed: Jul. 19, 2002

(51) Int. Cl.$^7$ ............................................. A01D 39/00
(52) U.S. Cl. ........................................... 56/341; 56/364
(58) Field of Search ........................ 56/341, 343, 344, 56/345, 350, 364

(56) References Cited

U.S. PATENT DOCUMENTS

| | | | |
|---|---|---|---|
| 4,150,525 A | * 4/1979 | De Busscher et al. ........ 56/14.6 |
| 4,385,555 A | * 5/1983 | Meloncelli et al. ........ 100/19 R |
| 4,490,968 A | 1/1985 | Cysewski | |
| 4,524,574 A | 6/1985 | Ratzlaff | |
| 4,604,858 A | 8/1986 | Esau et al. | |
| 4,846,198 A | * 7/1989 | Carnewal et al. .............. 460/21 |
| 4,999,987 A | 3/1991 | Eggenmueller | |
| 5,090,187 A | * 2/1992 | Mews ........................ 56/364 |
| 5,450,704 A | 9/1995 | Clostermeyer | |
| 5,499,948 A | * 3/1996 | Underwood ................. 460/119 |
| 5,595,055 A | 1/1997 | Horchler, Jr. et al. | |
| 5,819,516 A | 10/1998 | Anderson et al. | |
| 5,826,418 A | 10/1998 | Clostermeyer et al. | |
| 5,848,523 A | * 12/1998 | Engel et al. ................... 56/341 |
| 5,919,116 A | * 7/1999 | Edell ............................ 482/11 |
| 5,979,153 A | 11/1999 | Roth | |
| 6,000,206 A | 12/1999 | Case et al. | |
| 6,029,434 A | 2/2000 | Ratzlaff et al. | |
| 6,164,050 A | 12/2000 | Vande Ryse et al. | |
| 6,425,234 B1 | * 7/2002 | Krone et al. ................... 56/341 |
| 6,477,824 B2 | * 11/2002 | Preheim ....................... 56/341 |

* cited by examiner

Primary Examiner—Robert E. Pezzuto
Assistant Examiner—Nathan Mammen
(74) Attorney, Agent, or Firm—John William Stader; Collin A. Webb; Rebecca L. Henkel

(57) ABSTRACT

A round baler having a frame assembly, comprising: (a) a first frame assembly; (b) a pickup assembly comprising a pickup and a auger assembly integrally mounted on the first frame assembly to form a pickup module; (c) a second frame assembly connected to the first frame assembly; and (d) a conveyor module selected from the group consisting of a stuffer module and a rotor module, wherein each conveyor module comprises a conveyor mounted on the second frame assembly. The modular structure of the frame assembly facilitates manufacture of several diverse types of product balers while minimizing the complexity of the assembly line process.

8 Claims, 9 Drawing Sheets

MODULAR PICKUP, STUFFER, AND ROTOR

FIELD OF THE INVENTION

The present invention pertains broadly to an agricultural baler for forming cylindrical bales out of cut crop material. Such a baler is commonly referred to as a "round baler." More particularly, the invention is directed to an improved pickup apparatus or assembly that includes two modules, a pickup mechanism module and a stuffer mechanism module or a rotor mechanism module.

BACKGROUND OF THE INVENTION

Typical round balers (also referred to simply as a "baler"), such as disclosed in U.S. Pat. No. 6,209,450 to Naaktgeboren et al., which is incorporated herein by reference in its entirety, are agricultural machines that pick up a cut crop material from the ground and form it into a compacted round bale in a bale forming chamber. When the bale has been sufficiently compacted to a desired density (i.e., a variable chamber baler) or a desired size (i.e., a fixed chamber baler) depending on the baler construction, bale density sensors or bale size sensors, as is appropriate, send signals to a controller that subsequently sends a signal to an operator's panel to stop forward motion of the baler so that a bale wrapping operation can be performed. The formed bale is subsequently wrapped with netting or twine to produce a completed wrapped bale that is expelled to the ground through an open tailgate mechanism.

During field operation, the process of picking up cut crop material and transferring it to the bale forming chamber is conventionally performed by a pickup apparatus. One such pickup apparatus is disclosed in U.S. Pat. No. 5,595,055 to Horchler, Jr. et al., which is incorporated herein by reference in its entirety. Horchler, Jr. discloses that the pickup apparatus includes a pickup, two augers and a stuffer mechanism mounted on a single frame. The pickup includes a plurality of fingers or tines movable along a predetermined path to lift cut crop material from the ground and deliver it along a feed table towards a floor roll. The floor roll is rotatably mounted to the main frame of the baler and rotates to move cut crop material towards the bale forming chamber. The floor roll and a starter roll are both rotatably mounted to the main frame and define a transverse feed opening, also referred to as the "throat," through which the cut crop material must pass to enter into the bale forming chamber.

The pickup apparatus includes right and left opposing augers positioned downstream of the pickup because the pickup is much wider than the feed table. The right and left augers serve to direct cut crop material towards the feed table that is positioned along the central axis of the pickup apparatus. The stuffer is a mechanism for conveying cut crop material from the pickup to the bale forming chamber. More specifically, the stuffer has an array of side fingers mounted on a drive assembly so that each side finger is moved along an elliptical path. When the cut crop material reaches the feed table and engages the array of moving side fingers, the array feeds the cut crop material rearward into the bale forming chamber through the throat. Once through the throat, the cut crop material enters the bale forming chamber and is formed into a bale by one of the conventionally known methods.

Another type of pickup apparatus is disclosed in U.S. Pat. No. 6,164,050 to Vande Ryse et al., which is incorporated herein by reference in its entirety. Vande Ryse et al. discloses a pickup apparatus that includes a pickup and a rotatable conveyor, also referred to as a rotor, that comprises a plurality of blades that rotate and engage cut crop material. The pickup is similar to the pickup disclosed by the Horchler, Jr. Patent and is mounted on a single frame with the rotor. The pickup includes a plurality of fingers or tines movable along a predetermined path to lift cut crop material from the ground and deliver it along a feed table towards a floor roll. The floor roll is rotatably mounted to the main frame of the baler and rotates to move cut crop material towards the bale forming chamber. The floor roll and a starter roll are both rotatably mounted to the main frame and define a transverse feed opening, also referred to as the "throat," through which the cut crop material must pass to enter into the bale forming chamber.

The rotor is a mechanism for conveying cut crop material from the pickup to the bale forming chamber, but the rotor is different than a stuffer. More specifically, the rotor has an array of radially disposed blades mounted on a drive assembly so that each blade rotates about the axis of a drive shaft. When the cut crop material reaches the feed table and engages the array of radially disposed blades, the array feeds the cut crop material rearward into the bale forming chamber through the throat. Once through the throat, the cut crop material enters the bale forming chamber and is formed into a bale by one of the conventionally known methods.

Stuffer and rotor mechanisms have their advantages and disadvantages. More particularly, stuffers are less expensive to manufacture but they are less efficient at conveying cut crop material from the pickup to the bale forming chamber. Rotors are more expensive, but they are more efficient at conveying cut crop material from the pickup to the bale forming chamber. Furthermore, the blades of the rotor can be made with a cutting edge so that the rotor breaks down the cut crop material into smaller pieces while conveying the cut crop material to the bale forming chamber. This process of breaking the cut crop material down into smaller pieces before forming the bale is beneficial to farm animals that eating the cut crop material, making it easier to chew. Therefore, balers made with stuffers may be less expensive, but they are less efficient than balers manufactured to utilize a rotor. Balers manufactured with rotors are more expensive, but they are more efficient and can be used to break down the cut crop material into smaller pieces which facilitates consumption of the cut crop material by farm animals.

The drawback to having alternate types of pickup apparatuses available, those having a conveying stuffer and those having a conveying rotor, is related to limitations of assembly line manufacturing and product diversity. More specifically, balers manufactured with a pickup apparatus typically utilize similar pickup and auger mechanisms but differ with regard to which conveying mechanism is used, either the stuffer or the rotor conveying mechanisms. At present, the frames used to support the pickup apparatus mount the pickup and the stuffer together, or the pickup and the rotor together. It would be more efficient if the frame included a modular construction with a modular frame portion for mounting the pickup and the augers together to form a first module, and the conveying mechanism would be mounted to another distinct frame portion that is universally configured to permit an interchangeable selectivity of conveying mechanism during baler assembly. In other words, it would be beneficial to have a universal frame portion configured so that a baler manufacturer is able to selectively assemble the baler to have a stuffer, or in the alternative, to selectively assembly the baler to have a rotor, as the conveying mechanism without having to use completely different frames assembled on completely different assembly lines.

The present invention endeavors to provide an improved pickup assembly or apparatus that includes a pickup module providing a pickup and an auger assembly mounted to a unitary first frame assembly, and a conveying module selected from the group consisting of a stuffer module and a rotor module, wherein the conveying module includes a conveying mechanism mounted to a second frame assembly and the second frame assembly is connected to the first frame assembly thereby maintaining the advantages of the prior art pickup apparatuses while simplifying the manufacturing complexity and increasing product diversity.

Accordingly, an object of the present invention is to overcome the manufacturing complexity of the prior art balers.

Another object of the present invention is to provide a pickup assembly or apparatus that utilizes the same pickup and auger mechanisms while permitting the selective assembly of the baler to include either a stuffer module or a rotor module as the conveying mechanism.

Another object of the present invention is to decrease manufacturing costs by providing a simplified assembly process due to the selective interchangeability of the stuffer and rotor modules during baler manufacturing.

A further object of the present invention is to provide the first frame assembly with a core frame having a universal conveying module attachment portion and two drive shaft through holes so that either a stuffer conveying module or a rotor conveying module can be assembled with a pickup module while utilizing a minimum number of different parts and optimizing the number of shared parts.

SUMMARY OF THE INVENTION

In accordance with the above objectives, a first embodiment of the present invention provides a baler having a frame assembly, comprising: (a) a first frame assembly, including (i) a core frame having a first end member and a second end member attached to a central frame member, wherein the second end member has two through holes formed therein, and (ii) a hole closure plate disposed on the second end member so as to leave one of the two through holes at least partially uncovered, and to completely cover the other of the two through holes; (b) a pickup assembly comprising a pickup and a auger assembly integrally mounted on the first frame assembly to form a pickup module; (c) a second frame assembly connected to the first frame assembly; and (d) a conveyor module selected from the group consisting of a stuffer module and a rotor module, wherein each conveyor module comprises a conveyor mounted on the second frame assembly.

In accordance with a second embodiment of the present invention, the conveyor module is the stuffer module, and the stuffer module comprises a stuffer mounted on the second frame assembly, wherein the second frame assembly is a stuffer frame assembly.

In accordance with a third embodiment of the present invention, the second embodiment is further modified so that the stuffer includes a drive shaft and the first frame assembly comprises: a core frame having a first end member and a second end member attached to a central frame member, wherein the second end member has two through holes formed therein; and the drive shaft of the stuffer extends through one of the two through holes.

In accordance with a fourth embodiment, the conveyor module is the rotor module, and the rotor module comprises a rotor mounted on the second frame assembly, wherein the second frame assembly is a rotor frame assembly.

In accordance with a fifth embodiment, the rotor includes a drive shaft and the first frame assembly comprises: a core frame having a first end member and a second end member attached to a central frame member, wherein the second end member has two through holes formed therein; and the drive shaft of the rotor extends through one of the two through holes.

In accordance with an sixth embodiment, the fifth embodiment is further modified so that the first frame assembly further comprises: a hole closure plate disposed on the second end member so as to partially cover the one of the two through holes through which the drive shaft extends and to completely cover the remaining one of the two through holes.

In accordance with a seventh embodiment, the first frame assembly comprises: a core frame having a first end member and a second end member attached to a central frame member, wherein the second end member has first and second through holes formed therein and the core frame has a modular attachment portion configured to connect to the second frame assembly; wherein the second frame assembly of the stuffer module is a stuffer frame assembly and the second frame assembly of the rotor module is a rotor frame assembly that is different from the stuffer frame assembly.

Further objects, features and advantages of the present invention will become apparent from the Detailed Description of Preferred Embodiments, which follows. When considered together with the attached drawings.

DETAILED DESCRIPTION OF THE INVENTION

Figure 1:
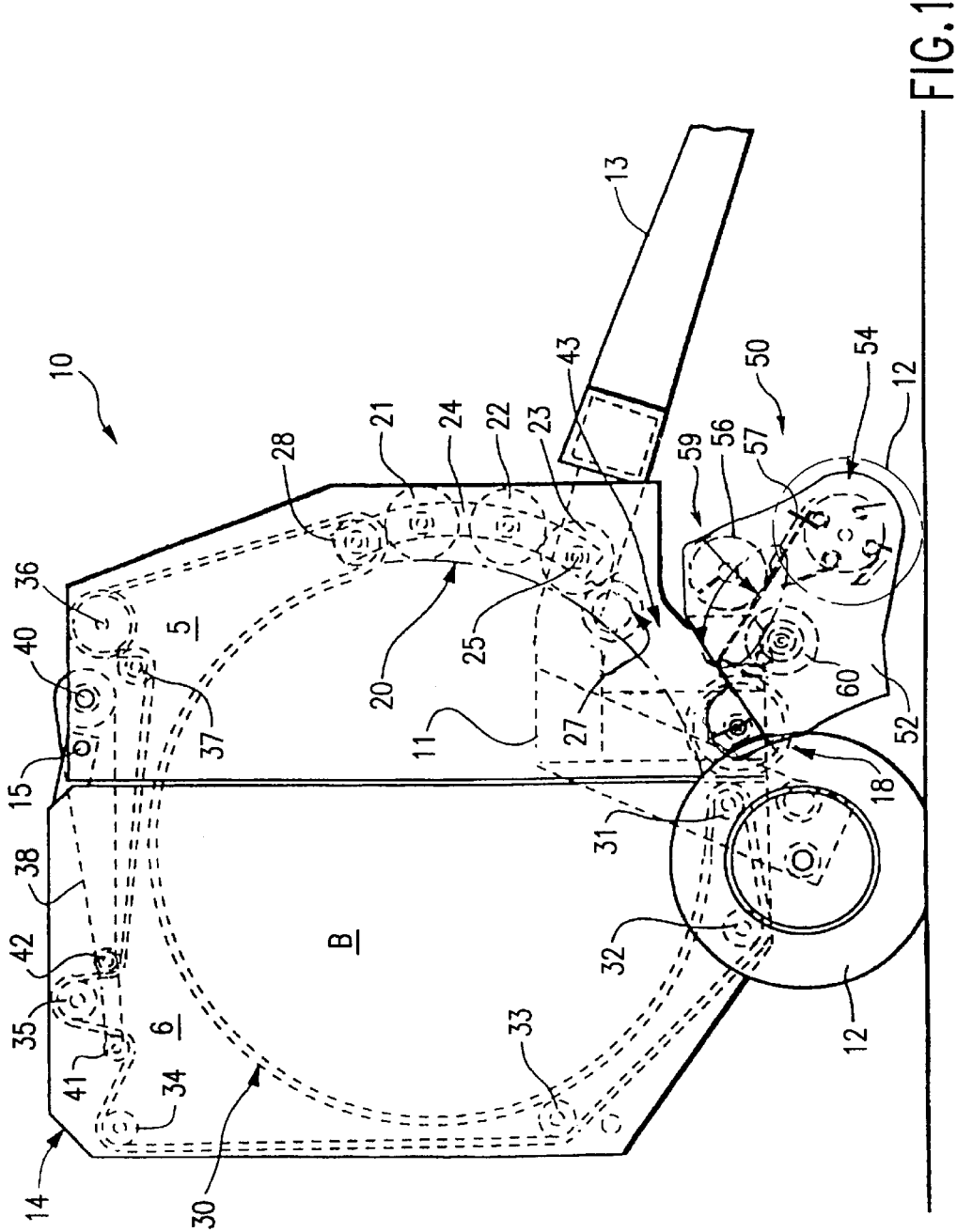
FIG. 1 is a side view of the round baler in which the present invention is embodied.

The preferred embodiments of the invention will now be described with reference to the Figures in which like parts are indicated by like reference numerals. The apparatus of the present invention as shown in FIG. 1 is an expandable chamber round baler 10 of the type disclosed in U.S. Pat. No. 4,956,968 to Underhill, which is incorporated herein by reference in its entirety. One skilled in the art would realize that the present invention can be practiced on fixed chamber round balers without departing from the scope of the invention.

Baler 10 includes main frame/housing 11 supported by a pair of wheels 12 rotatably connected to frame 11, a tongue 13 attached to the forward portion of frame 11 for connecting to a tractor or other work vehicle, and a tailgate 14 pivotally connected to frame 11 by stub shafts 15 so that the tailgate is closed during formation of a wrapped bale as shown in FIG. 1 and opened to discharge a completed wrapped bale to the ground for subsequent handling as is generally known.

Figure 2:
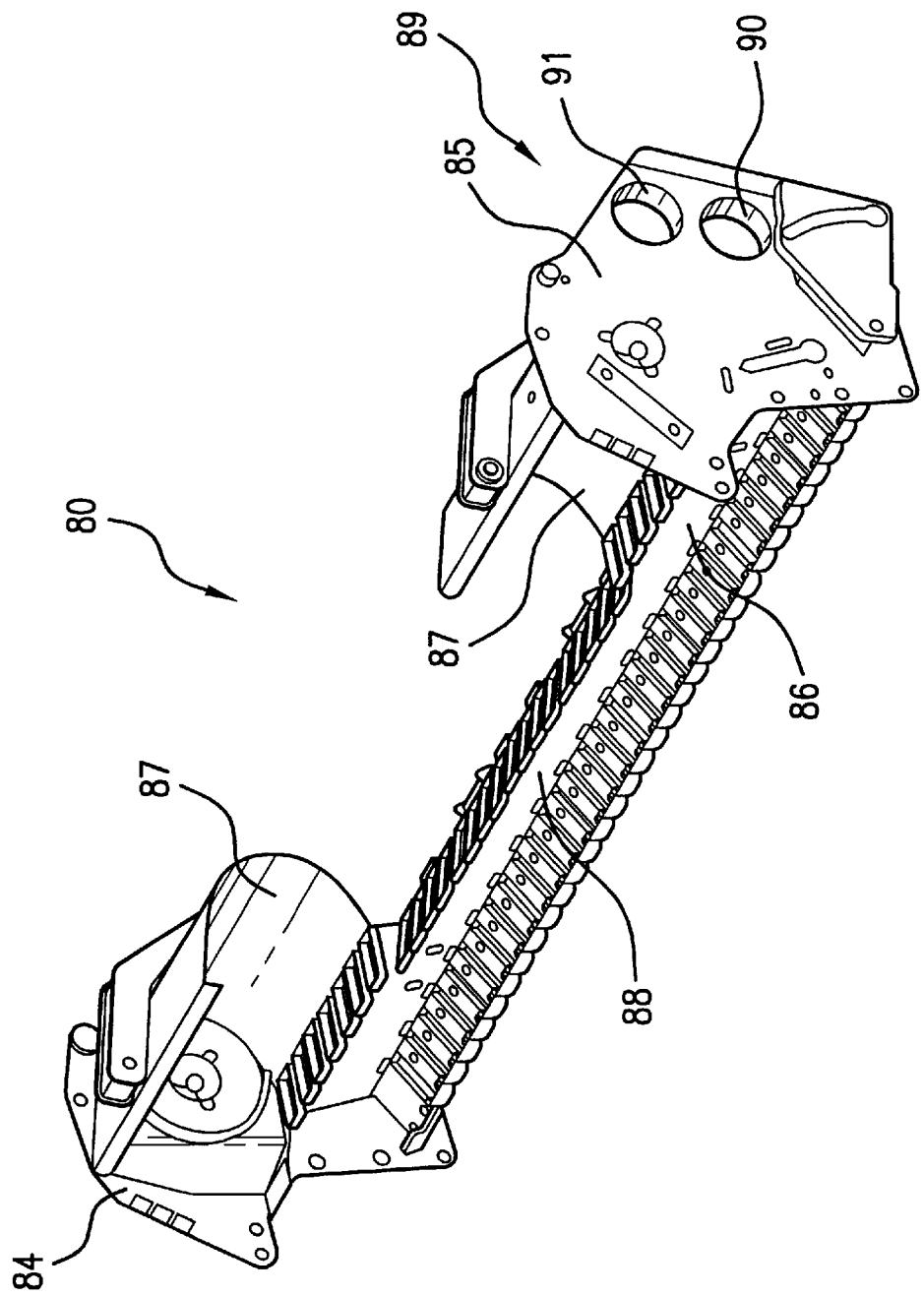
FIG. 2 is a perspective view of the core frame of the first frame assembly.

A pickup apparatus 50 is mounted on the main frame 11 as will be described in detail below. Pickup apparatus 50 picks up cut crop material, such as straw, hay, etc., from the ground and conveys it to the bale forming chamber defined by sidewalls 5 (only one shown) of frame 11, sidewalls 6 (only one shown) of tailgate 14 wherein sidewalls 5 and 6 are coextensive, apron 30, floor roll 18 and starter roll 27. Pickup apparatus 50 includes a first frame assembly 52, a pickup 54 mounted to the first frame assembly, two augers 56 mounted integrally with the pickup 54 to form a pickup unit or module 82, a second frame assembly that is distinct from the first frame assembly but which is connected thereto, and a conveyor 60 mounted to the second frame assembly to form a conveyor module. The core frame 80 of the first frame assembly 52 is shown in FIG. 2 and will be described in detail later. Pick up module 82 shown in FIG. 3 includes pickup 54 and augers 56 mounted to the core frame 80 of first frame assembly 52.

Pickup 54 includes a plurality of fingers or tines 57 that are movable along a predetermined path to lift cut crop material from the ground and deliver it to a feed table 59 toward floor roll 18 which is rotatably mounted to frame 11. Opposing augers 56 are mounted rearward of pickup 54 on the first frame assembly 52 and operate to move cut crop material towards the feed table 59 positioned along a central axis of the pickup apparatus 50. Conveyor 60 is mounted to the second frame assembly and is disposed adjacent to feed table 59 so that conveyor 60 can serve to convey cut crop material from feed table 59 through infeed opening 43 (also known as the "throat") defined by floor roll 18 and starter roll 27. Cut crop material that passes through throat 43 enters the bale forming chamber and is formed into a bale B.

Baler 10 includes a sledge assembly 20 having a plurality of rollers 21, 22, 23 extending transversely of main frame 11 in an arcuate array. Rollers 21, 22, 23 are journalled at their ends in a pair of spaced apart arms 24 (only one shown) pivotally mounted between sidewalls 5 of frame 11 on stub shafts 25 for allowing pivotal movement of the sledge assembly 20 between a bale starting position (as is conventionally known) and a full bale position (shown in FIG. 1). Rollers 21, 22, 23 are driven in a counterclockwise direction by a conventional drive connected to the power takeoff of a tractor or other work vehicle. Starter roll 27 is adjacent roller 23 and is also driven in a counter clockwise direction to strip cut crop material from roller 23. A freely rotatable idler roller 28 is also mounted on arms 24 for movement with sledge assembly 20.

Apron 30 includes a plurality of continuous flat side by side belts supported by guide rolls 31, 32, 33, 34, 35 rotatably mounted in tailgate 14. Apron 30 is also supported on drive roll 36 rotatably mounted on frame 11. Drive roll 36 is driven to rotate by a conventional drive assembly (not shown) to rotate in a direction causing movement of apron 30 along the path indicated in broken lines in FIG. 1. An additional guide roll 37 in frame 11 ensures proper driving engagement between apron 30 and drive roll 36. A pair of take up arms 38 (one shown) are pivotally mounted on frame 11 by a cross shaft tube 40 for movement between varying inner and fixed outer positions, corresponding to bale forming conditions and a fully formed bale condition, respectively. The fully formed bale position is shown in FIG. 1 and will suffice for the purposes of the description of this invention. Further, it should be noted that take up arms 38 carry additional guide rolls 41, 42 for supporting apron 30. A resilient structure (not shown) is normally provided to urge take arms 38 up toward their inner positions while resisting movement thereof from their inner positions to their outer positions to keep tension on the roll forming belts in a known manner.

As baler 10 is towed across a field by a tractor or other work vehicle, pick up tines 57 lift cut crop material, usually in a windrow, from the ground and deliver it to augers 56, which converge the material and urge it to feed table 59 where conveyor 60 engages the material and feeds it rearward through throat 43 and into the bale forming chamber. Cut crop material fed into the bale forming chamber is continuously coiled in a clockwise direction until inner courses of apron 30 expand to the position shown in FIG. 1. This formation of a cylindrical bale package takes place in a well known manner, after which the package is wrapped, tailgate 14 is opened, the bale B is discharged rearward, tailgate 14 is closed, and the baler 10 is again ready to form another bale.

With reference to FIGS. 2–7, the versatile feature of the present invention will now be described in detail. Specifically, the pickup apparatus 50 is constructed to have a universal pickup module 82 that is connectable during manufacture to either one of two types of conveyor modules, that is, either (a) a stuffer conveyor module 100, or a rotor conveyor module 150. Each of the conveyor modules includes a conveyor mounted to a conveyor frame assembly, wherein the conveyor frame assembly is constructed to connect, by welding or by fasteners (i.e., bolts, screws, etc.), to the universal frame of the pickup module 82. In other words, the frame of the pickup module 82 is constructed so as to permit assembly of the pickup module 82 to either the stuffer conveyor module 100 or the rotor conveyor module 150, thereby allowing for decreasing the complexity of pickup apparatus assembly while increasing the diversity of assembled product produced to either one of a pickup apparatus 200 having a stuffer apparatus and a pickup apparatus 250 having a rotor apparatus.

Figure 3:
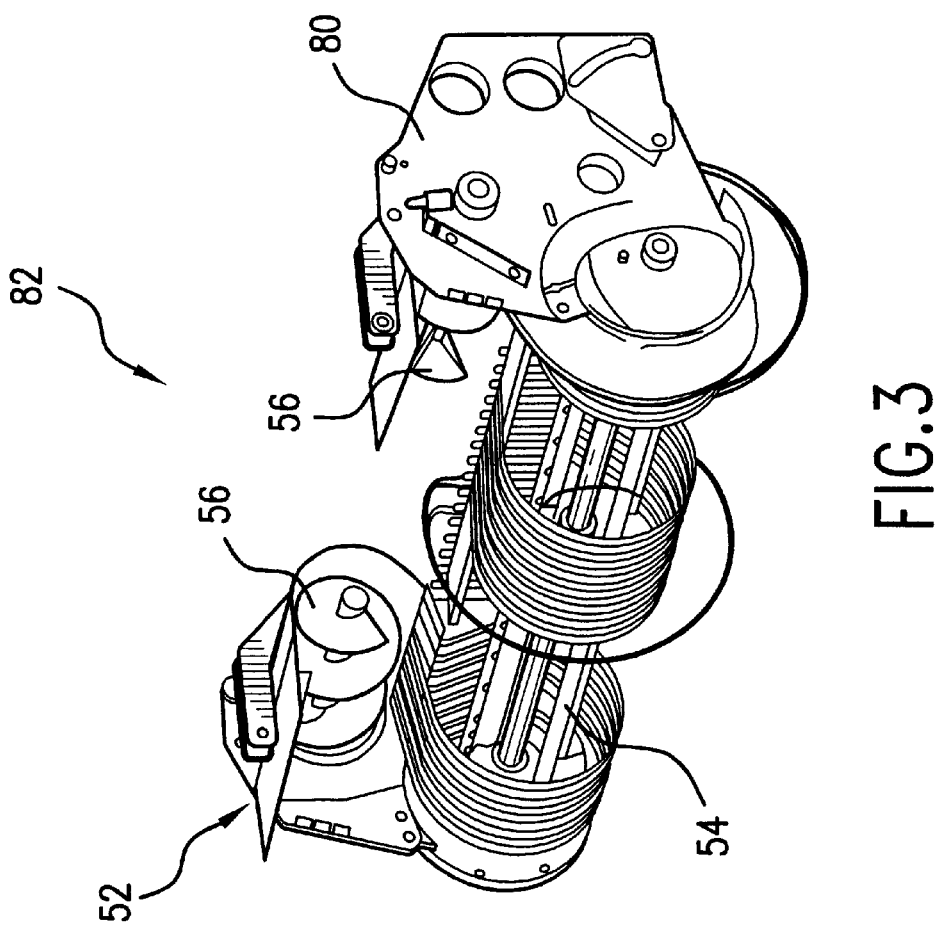
FIG. 3 is a perspective view of the pickup module.
Figure 6:
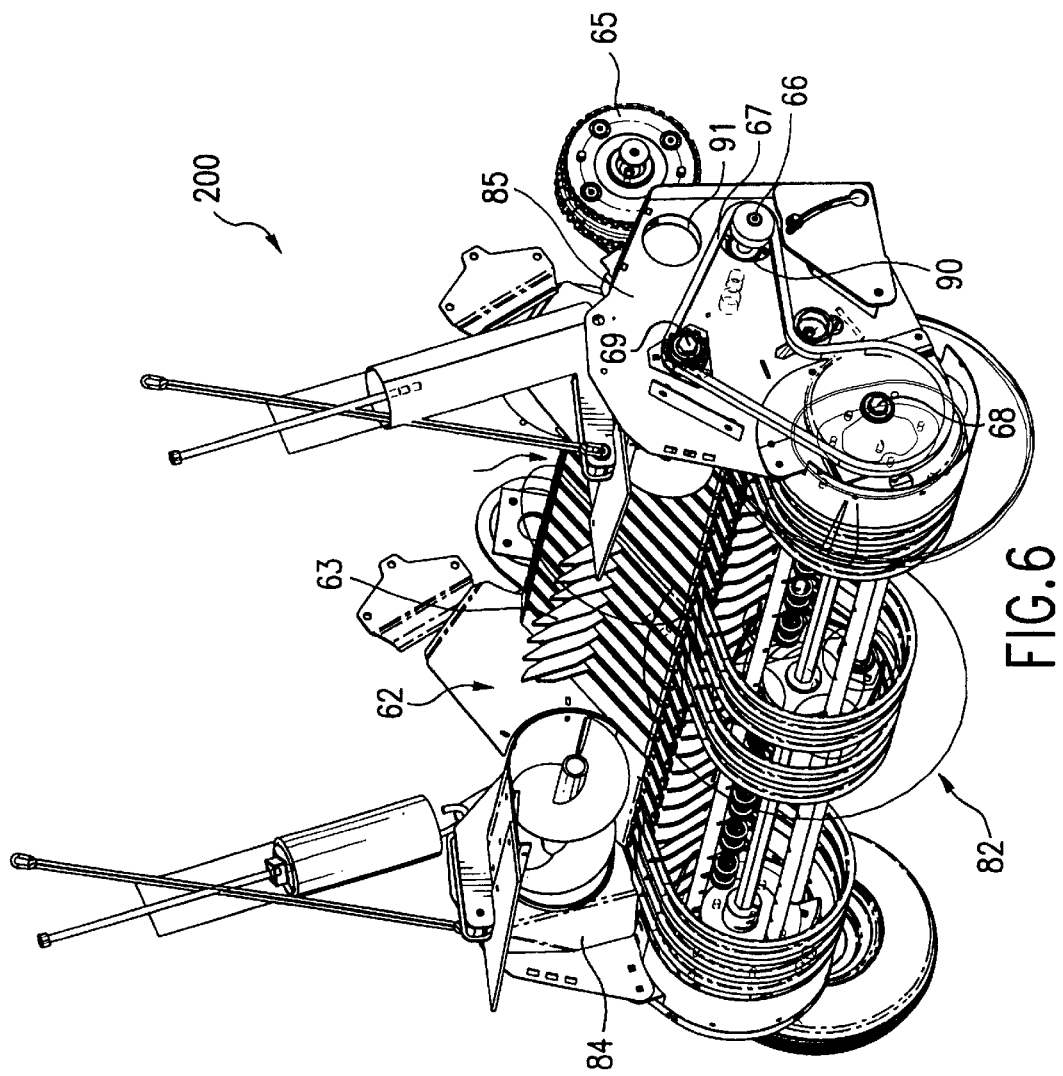
FIG. 6 is a perspective view of one embodiment of the pickup apparatus having the pickup module connected to and assembled with a stuffer conveyor module.
Figure 7:
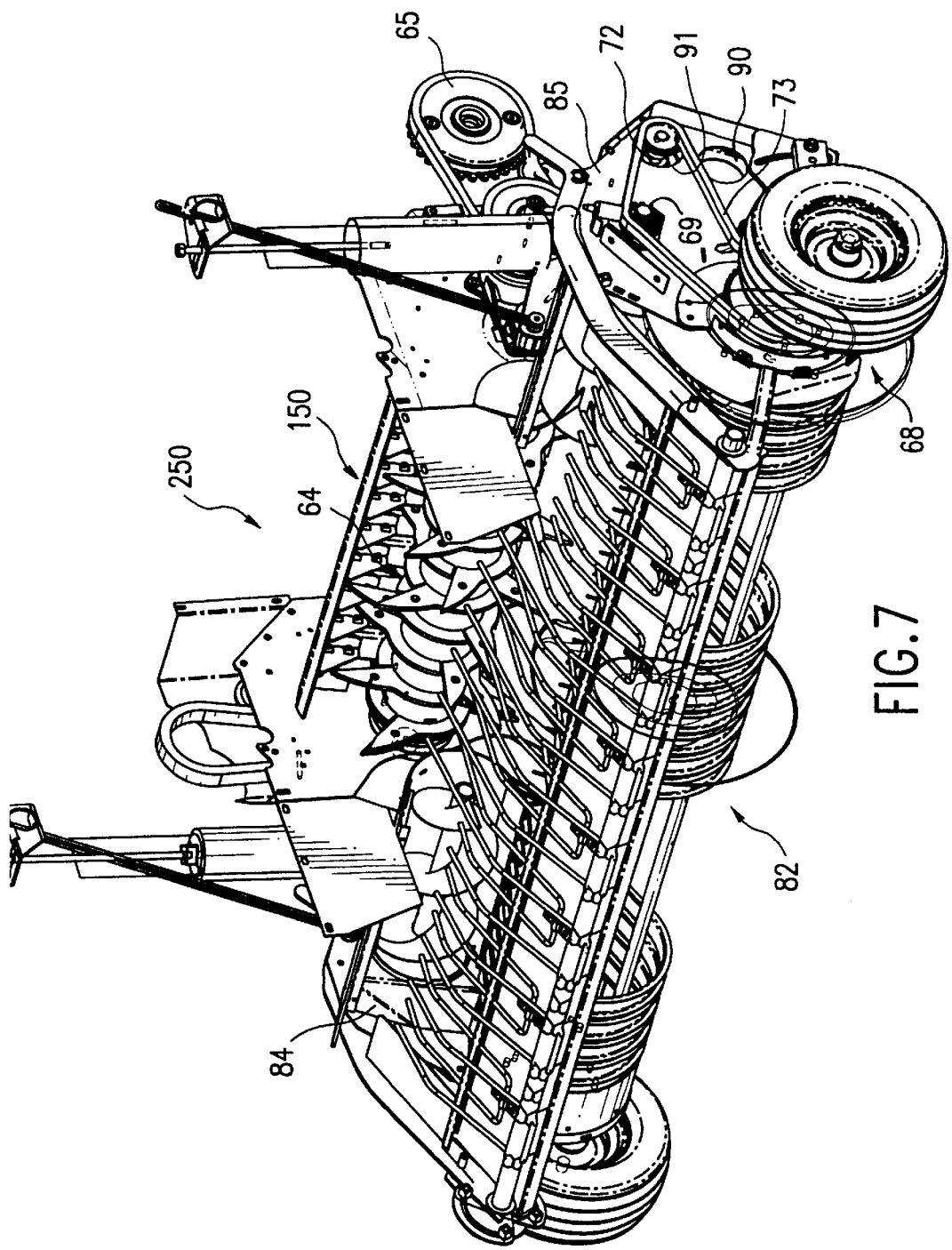
FIG. 7 is a perspective view of another embodiment of the pickup apparatus having the pickup module connected to and assembled with a rotor conveyor module.

FIGS. 2 and 3 show that the pickup module 82 includes a core frame 80. Core frame 80 includes end members 84 and 85 connected to a central frame member 86. Frame 80 includes auger housing portions 87 for receiving and housing the augers 56, and a pickup portion 88 for receiving and supporting the pickup 54. Core frame 80 is configured so that either conveyor module, that is (a) stuffer module 100 or (b) rotor module 150, can be attached to the module attachment portion 89 (see also FIGS. 8 and 9) on the rear surface of frame 80. End member 85 is formed with two through holes 90, 91 formed therein. Through hole 90 serves to provide a hole opening through which drive shaft 66 of stuffer apparatus 62 extends when the pickup apparatus is assembled with a stuffer module 100 connected to a pickup module 82 as shown in FIG. 6. Through hole 91 serves to provide a hole opening through which drive shaft 72 of rotor apparatus 64 extends when the pickup apparatus is assembled with a rotor module 150 connected to a pickup module 82 as shown in FIG. 7. It is noted that the universal nature of the module attachment portion 89 and the through holes 90 and 91 of core frame 80 are features of the present invention that make interchangeability of conveyor modules possible during assembly of a pickup apparatus.

As referred to earlier, conveyer 60 can be constructed as either a stuffer apparatus 62 or a rotor apparatus 64 as are conventionally known. Stuffer apparatus 62 (See FIGS. 4 and 6) includes a plurality of fingers 63 connected by a mechanical transmission mechanism to a drive assembly 65 for moving the fingers in an elliptical manner as is conventionally known to convey cut crop material. The drive assembly 65 is also connected by the mechanical transmission mechanism to drive shaft 66 that engages drive belt 67. Drive belt 67 engages pickup drive shaft 68 and auger drive shaft 69 as is conventionally known and serves to rotate pickup 54 and the augers 56 of pickup module 82 simultaneously while drive assembly 65 actuates stuffer apparatus 62.

Figure 4:
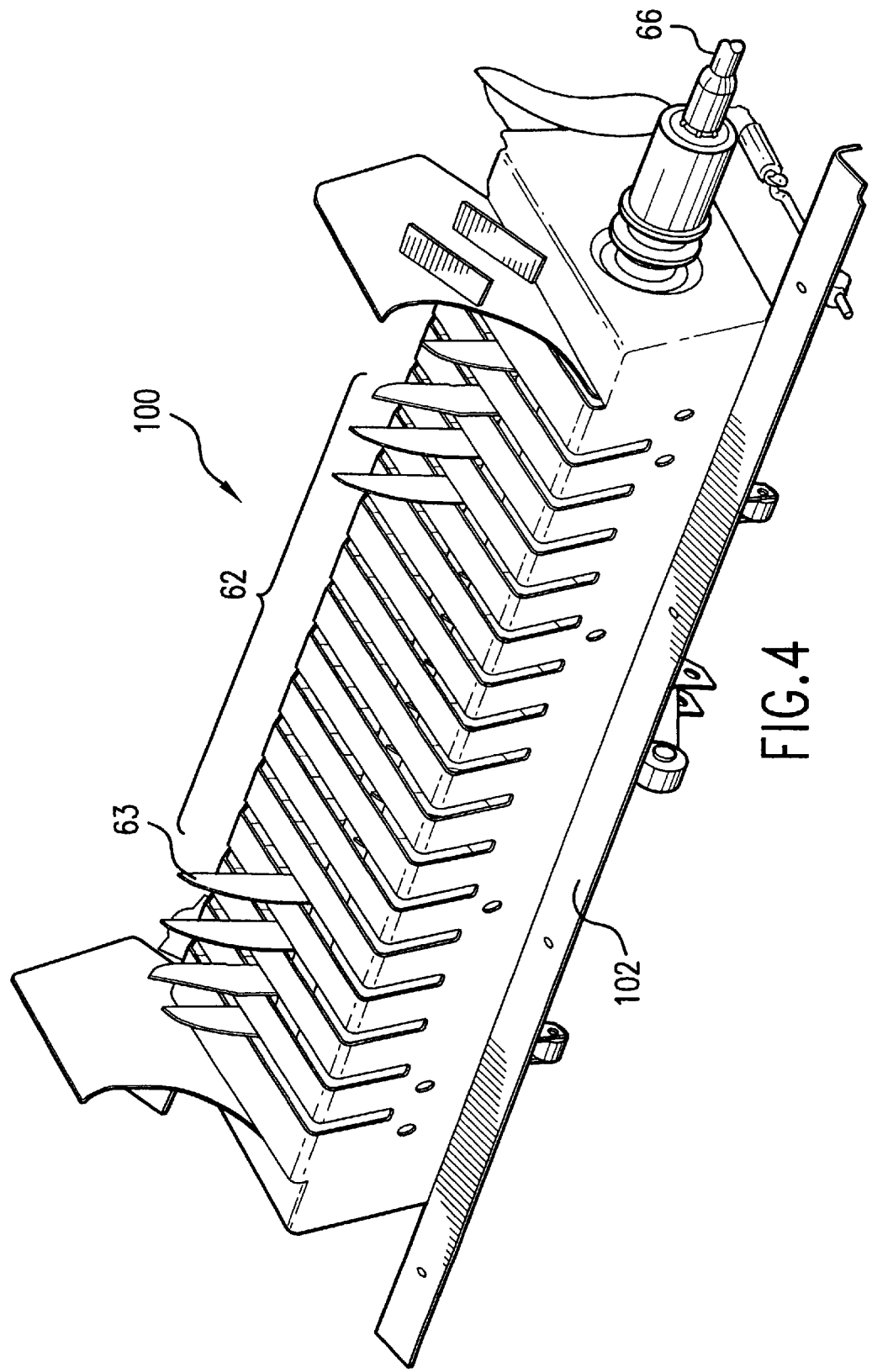
FIG. 4 is a perspective view of the stuffer conveyor module.
Figure 8:
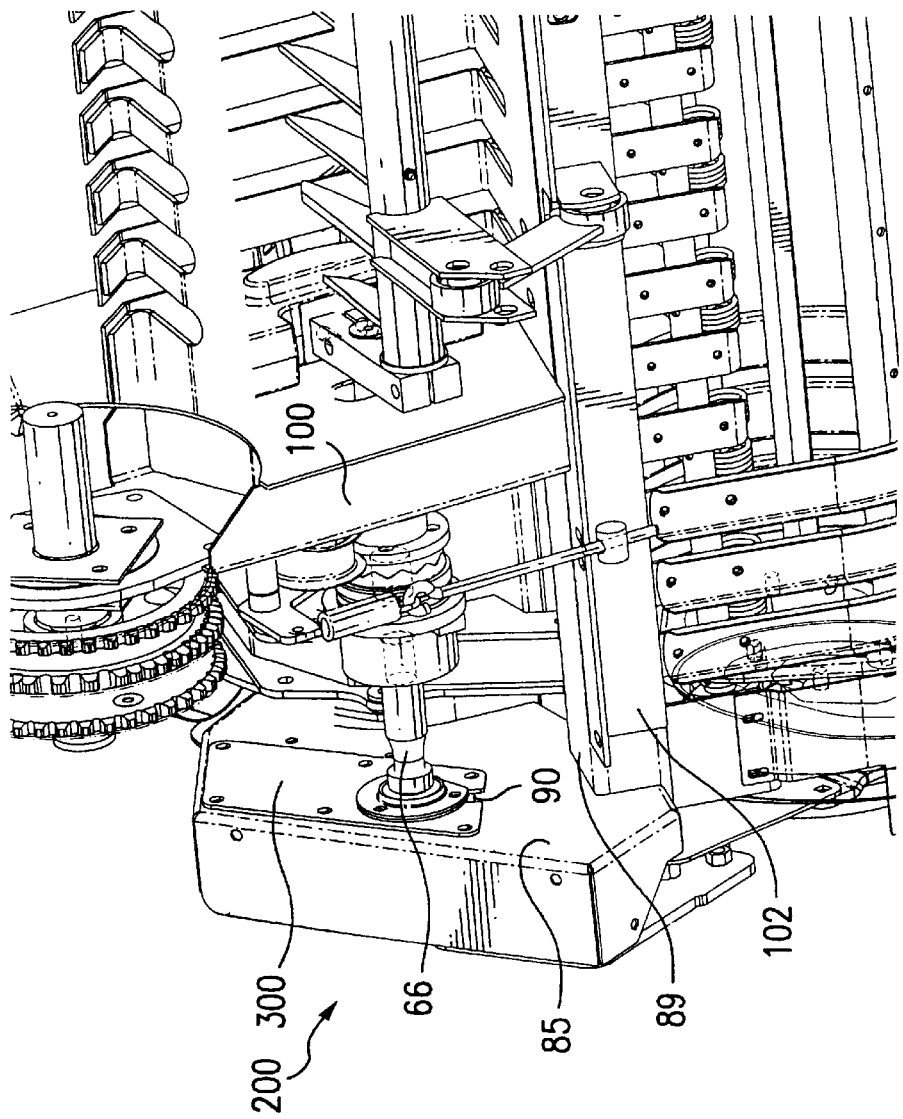
FIG. 8 is a view from underneath the pickup apparatus of FIG. 6.

In one embodiment of the present invention, the conveyer module utilized is a stuffer conveyer module 100, as shown in FIG. 4, that has a second frame assembly provided by the stuffer frame assembly 102, which houses the stuffer apparatus 62. Stuffer frame assembly 102 is configured to attach to the module attachment portion 89 of core frame 80 as shown in FIGS. 6 and 8. FIG. 6 illustrates the pickup apparatus 200 having pickup module 82 connected to and assembled with stuffer conveyor module 100.

Figure 5:
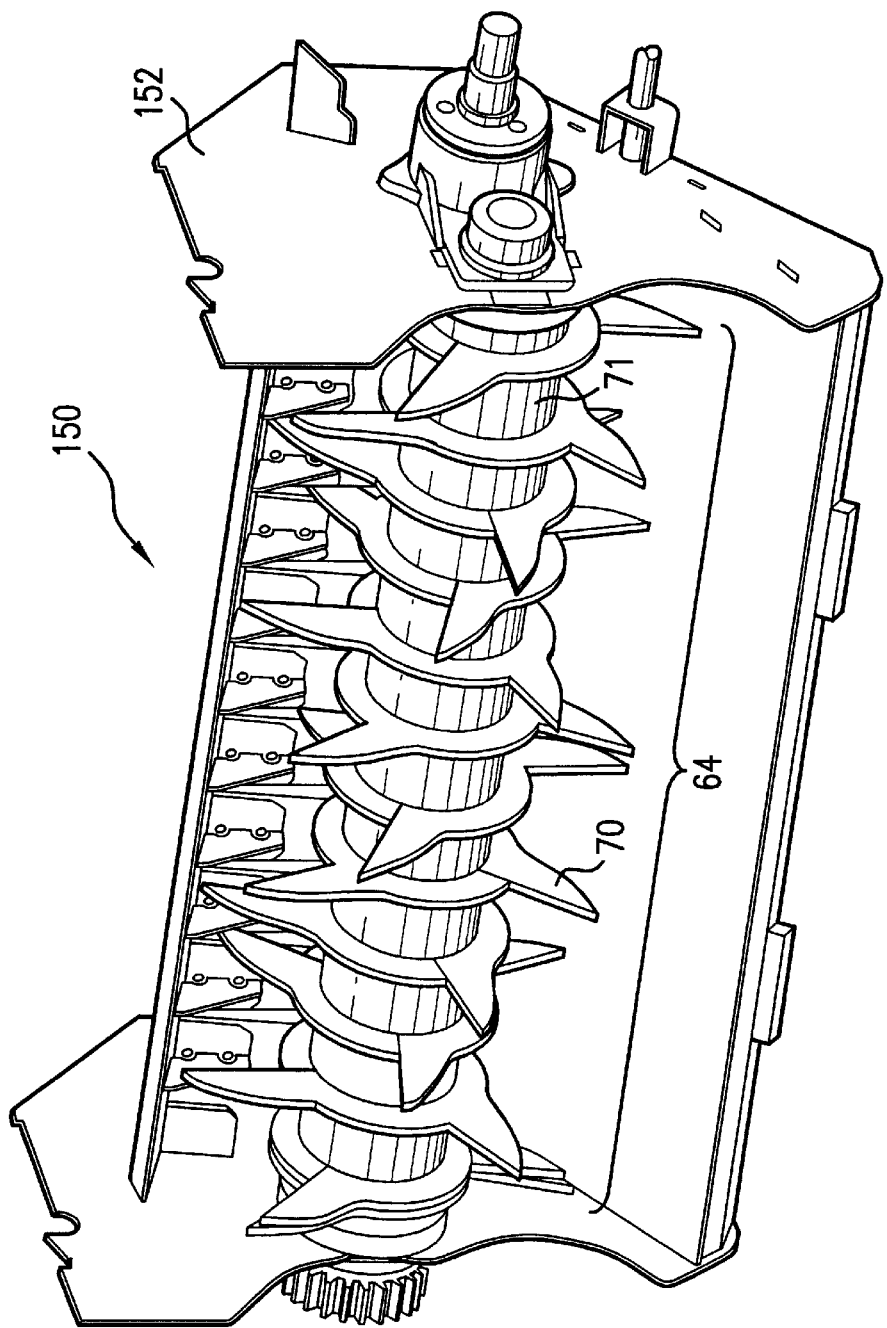
FIG. 5 is a perspective view of the rotor conveyor module.
Figure 9:
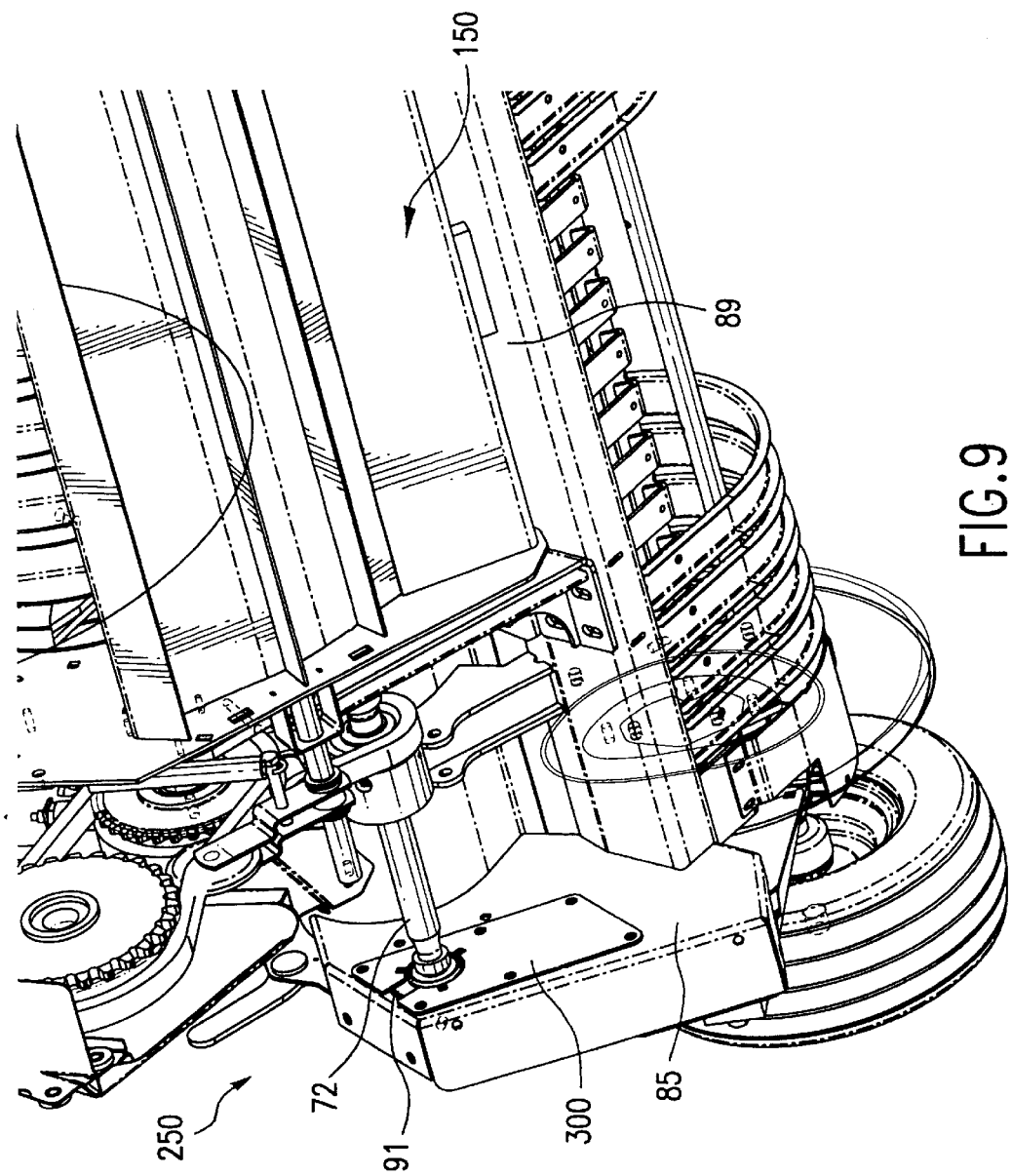
FIG. 9 is a view from underneath the pickup apparatus of FIG. 7.

In another embodiment of the invention, the conveyor module is a rotor conveyor module 150, as shown in FIG. 5, that has a second frame assembly provided by rotor frame assembly 152, which houses the rotor apparatus 64. Rotor frame assembly 152 is configured to attach to the module attachment portion 89 of core frame 80 as shown in FIGS. 7 and 9. Rotor apparatus 64 includes a plurality of radial blades 70 mounted on blade shaft 71 that is rotatably mounted to rotor frame assembly 152. Blades 70 may be cutting or non-cutting blades as are conventionally known. Shaft 71 is connected by a mechanical transmission mechanism to drive assembly 65, which serves to drive the shaft 71 to rotate in a prescribed manner as is conventionally known to effectively convey cut crop matter. In this embodiment, drive assembly 65 is also connected by the mechanical transmission mechanism to drive shaft 72 that engages drive belt 73. Drive belt 73 is positioned to engage pickup drive shaft 68 and auger drive shaft 69 as is conventionally known and serves to rotate pickup 54 and the augers 56 of pickup module 82 simultaneously while drive assembly 65 actuates rotor apparatus 64. FIG. 7 illustrates the pickup apparatus 250 having pickup module 82 connected to and assembled with rotor conveyor module 150.

It is noted that the first frame assembly 52 of the pickup module 82 is provided with a hole closure plate 300 as shown in FIGS. 8 and 9. Hole closure plate 300 is attached to end member 85 of core frame 80 so as to close and cover one of the through holes 90 and 91. Specifically, as shown in the pickup apparatus 200 of FIG. 8, when drive shaft 66 of stuffer apparatus 62 extends through through hole 90, plate 300 is disposed so as to partially close and cover through hole 90 and completely close and cover through hole 91. As shown in the pickup apparatus 250 of FIG. 9, when drive shaft 72 of rotor apparatus 64 extends through through hole 91, plate 300 is disposed so as to partially close and cover through hole 91 and to completely close and cover through hole 90. The purpose of hole cover plate 300 is to partially close and cover whichever through hole is receiving a drive shaft while completely covering the remaining empty through hole so as to minimize and/or prevent debris from passing through the through holes 90 and 91 during operation of the pickup apparatus. In this manner, the internal driving mechanism of the pickup apparatus, which includes pickup drive shaft 68, auger drive shaft 69, drive belt 67, 73 and a respective one of the drive shafts 66 and 72, depending on the embodiment, is protected from debris flowing through the through holes 90 and 91. The difference between the embodiments of pickup apparatus 200 and 250 with respect to the hole closure plate 300 is directed to the orientation of the plate 300 relative to the end member 85. In both embodiments, the same plate 300 is used thereby conserving on the number of independent parts required to manufacture each embodiment.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A baler having a frame assembly, comprising:
   (a) a first frame assembly, including
      (i) a core frame having a first end member and a second end member attached to a central frame member, wherein the second end member has two through holes formed therein, and
      (ii) a hole closure plate disposed on the second end member so as to leave one of the two through holes at least partially uncovered, and to completely cover the other of the two through holes;
   (b) a pickup assembly comprising a pickup and an auger assembly integrally mounted on the first frame assembly to form a pickup module;
   (c) a second frame assembly connected to the first frame assembly; and
   (d) a conveyor module alternatively selected from the group consisting of a stuffer module and a rotor module, wherein each conveyor module comprises a conveyor mounted on the second frame assembly and wherein said rotor module is readily removable and replaceable by said stuffer module and said stuffer module is readily removable and replaceable by said rotor module, wherein when the conveyor module is the stuffer module, the stuffer module comprises a stuffer mounted on the second frame assembly and the second frame assembly is a stuffer frame assembly, and wherein when the conveyor module is a rotor module, the rotor module comprises a rotor mounted on the second frame assembly and the second frame assembly is a rotor frame assembly.

2. A baler as recited in claim 1, wherein the stuffer includes a drive shaft extending through one of the two through holes.

3. A baler as recited in claim 2, wherein the hole closure plate disposed on the second end member partially covers the one of the two through holes through which the drive shaft extends and completely cover the other of the two through holes.

4. A baler as recited in claim 3, wherein the first frame assembly comprises:
   a core frame having a first end member and a second end member attached to a central frame member, wherein the second end member has first and second through holes formed therein and the core frame has a modular attachment portion configured to connect to the second frame assembly.

5. A baler as recited in claim 1, wherein the first frame assembly comprises:
   a core frame having a first end member and a second end member attached to a central frame member, wherein the second end member has first and second through holes formed therein and the core frame has a modular attachment portion configured to connect to the second frame assembly.

6. A baler as recited in claim 1, wherein the rotor includes a drive shaft extending through one of the two through holes.

7. A baler as recited in claim 6, wherein the a hole closure plate disposed on the second end member partially covers the one of the two through holes through which the drive shaft extends and completely covers the other of the two through holes.

8. A baler as recited in claim 7, wherein the first frame assembly comprises:

a core frame having a first end member and a second end member attached to a central frame member, wherein the second end member has first and second through holes formed therein and the core frame has a modular attachment portion configured to connect to the second frame assembly.

* * * * *